(12) United States Patent
Fried

(10) Patent No.: US 11,374,892 B2
(45) Date of Patent: **\*Jun. 28, 2022**

(54) SYSTEM FOR BRIDGING, MANAGING, AND PRESENTING SMARTPHONE AND OTHER DATA FILES WITH TELEPHONY INTERACTIONS

(71) Applicant: Flash App, LLC, Norcross, GA (US)

(72) Inventor: Lance Fried, Aventura, FL (US)

(73) Assignee: Flash App, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,560

(22) Filed: Feb. 4, 2021

(65) Prior Publication Data

US 2021/0160206 A1 May 27, 2021

Related U.S. Application Data

(63) Continuation of application No. 15/045,427, filed on Feb. 17, 2016, now Pat. No. 10,951,567.

(Continued)

(51) Int. Cl.
*H04L 51/18* (2022.01)
*H04M 3/42* (2006.01)
(Continued)

(52) U.S. Cl.
CPC ............ *H04L 51/18* (2013.01); *H04L 51/046* (2013.01); *H04L 51/10* (2013.01); *H04L 51/32* (2013.01);
(Continued)

(58) Field of Classification Search
CPC ..... H04W 4/20; H04W 4/21; H04M 3/42042; H04M 3/42051; H04L 51/10; H04L 51/046; H04L 51/18; H04L 51/32; H04L 51/36

See application file for complete search history.

(56) References Cited

U.S. PATENT DOCUMENTS 7,627,828 B1   12/2009   Collison et al.
8,577,000 B1   11/2013   Brown
(Continued)

FOREIGN PATENT DOCUMENTS

KR   100616318 B1   8/2006

OTHER PUBLICATIONS

"Social Caller ID", Jul. 1, 2015, ip.com Disclosure No. IPCOM000242280D, pp. 1-8. (Year: 2015).*

(Continued)

*Primary Examiner* — Gregory Todd
(74) *Attorney, Agent, or Firm* — Stetina Brunda Garred and Brucker

(57) ABSTRACT

A system for interfacing with mobile carrier networks, mobile application-equipped devices, social media networks, and individual and Enterprise user's databases, contacts, pictures, videos, and text is disclosed. A data link is connected to a mobile carrier network to receive user application and other data. Additional data links are connected to a user's stored smartphone content, including contacts, pictures, videos and other stored information as well as databases and an application-equipped device to obtain and exchange information in determining data selection, routing, presentation, and updating instructions. A user interface is connected to the system to accept configurable conditions for determining selection, routing and sharing instructions. There is a data conversion function for each data source. Synchronization between stored user preferences to automated or semi-automated updates and routes is provided by application driven consumer defined preferences.

14 Claims, 5 Drawing Sheets

Related U.S. Application Data

(60) Provisional application No. 62/219,396, filed on Sep. 16, 2015, provisional application No. 62/117,687, filed on Feb. 18, 2015.

(51) Int. Cl.
  H04L 51/52 (2022.01)
  H04L 51/10 (2022.01)
  H04L 51/56 (2022.01)
  H04L 51/046 (2022.01)
  H04W 4/21 (2018.01)
  G06F 16/9535 (2019.01)
  H04L 67/306 (2022.01)
  H04L 67/63 (2022.01)

(52) U.S. Cl.
  CPC ........ H04L 51/36 (2013.01); H04M 3/42042 (2013.01); H04M 3/42051 (2013.01); G06F 16/9535 (2019.01); H04L 67/306 (2013.01); H04L 67/327 (2013.01); H04W 4/21 (2018.02)

(56) References Cited

U.S. PATENT DOCUMENTS

| | | | |
|---|---|---|---|
| 8,799,794 | B2 | 8/2014 | Cobb et al. |
| 9,634,855 | B2 | 4/2017 | Poltorak |
| 9,742,907 | B2* | 8/2017 | Nezarati ............... H04L 67/306 |
| 2004/0179039 | A1 | 9/2004 | Blattner et al. |
| 2005/0216550 | A1 | 9/2005 | Paseman et al. |
| 2007/0173236 | A1 | 7/2007 | Vishwanathan et al. |
| 2007/0192428 | A1 | 8/2007 | Goldfarb et al. |
| 2008/0250066 | A1 | 10/2008 | Ekstrand et al. |
| 2009/0143052 | A1* | 6/2009 | Bates ................. H04M 3/4931 455/414.2 |
| 2011/0014932 | A1 | 1/2011 | Estevez |
| 2011/0197163 | A1 | 8/2011 | Jegal et al. |
| 2011/0283190 | A1 | 11/2011 | Poltorak |
| 2011/0288897 | A1 | 11/2011 | Erhart et al. |
| 2012/0196581 | A1* | 8/2012 | Papakipos ............... H04L 51/32 455/415 |
| 2013/0051542 | A1* | 2/2013 | Yao .......................... H04L 51/38 709/204 |
| 2013/0179156 | A1 | 7/2013 | Fried et al. |
| 2013/0254233 | A1 | 9/2013 | Fagundes et al. |
| 2013/0286223 | A1 | 10/2013 | Latta et al. |
| 2014/0023183 | A1 | 1/2014 | Brown et al. |
| 2014/0074728 | A1* | 3/2014 | Margulies .............. G06Q 30/01 705/304 |
| 2014/0161241 | A1 | 6/2014 | Baranovsky et al. |
| 2014/0245180 | A1 | 8/2014 | Kuramura et al. |
| 2015/0007351 | A1 | 1/2015 | Janajri et al. |
| 2015/0172336 | A1 | 6/2015 | Guignon et al. |
| 2015/0288640 | A1 | 10/2015 | Lee |
| 2015/0304490 | A1 | 10/2015 | Huang et al. |
| 2016/0057609 | A1 | 2/2016 | Nebel |

OTHER PUBLICATIONS

Mayo, Benjamin; 9TO5Mac; "iOS 13 Messages: How to choose profile photo and display name for iMessage"; [https:9to5mac.com/2019/06/13/ios-13-messages-how-to-choose-profile-photo-and-display-name-for-imessage/] (Jun. 13, 2019).

International Search Report and Written Opinion of International Application No. PCT/US2016/018407, dated Jun. 10, 2016, 10 pages.

Patent Cooperation Treaty, International Search Report and Written Opinion of International Application No. PCT/US19/43890, dated Dec. 9, 2019, 10 pages.

* cited by examiner

SYSTEM FOR BRIDGING, MANAGING, AND PRESENTING SMARTPHONE AND OTHER DATA FILES WITH TELEPHONY INTERACTIONS

CROSS-REFERENCE TO RELATED APPLICATIONS

This application is a continuation of U.S. application Ser. No. 15/045,427, filed Feb. 17, 2016 entitled SYSTEM FOR BRIDGING, MANAGING, AND PRESENTING SMARTPHONE & OTHER DATA FILES WITH TELEPHONY INTERACTIONS which relates to and claims the benefit of U.S. Provisional Application No. 62/117,687 filed Feb. 18, 2015 and entitled "SYSTEM FOR BRIDGING, MANAGING, AND PRESENTING SMARTPHONE & OTHER DATA FILES WITH TELEPHONY INTERACTIONS", and U.S. Provisional Application No. 62/219,396 filed Sep. 16, 2015 and entitled "SYSTEM FOR BRIDGING, MANAGING, AND PRESENTING SMARTPHONE & OTHER DATA FILES WITH TELEPHONY INTERACTIONS" the entire disclosures of each which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to telecommunication systems, and more particularly to cellular telecommunications, smartphone applications, and social network systems.

2. Related Art

Smartphones, social networks, and telecommunication systems facilitate the sharing of comments, photographs, and other data amongst mobile users. These users typically establish accounts for smartphone data storage, application downloads and social networks, create profiles containing basic biographic data, and create individual contact lists to share personal data and communicate with. The subject matter of comments posted on social networking sites oftentimes touch upon daily life experiences, including those relating to user status, commentary, and photographs. Today over 70% of all social posts occur on mobile smartphone devices. Accordingly, the viewing and sharing of user-generated content on smartphones to social networking sites from smartphones provides users a valuable and entertaining experience.

Various social network systems offering mobile applications for smartphone users to post are known in the art, including Facebook, LinkedIn, Twitter, Instagram, and so forth. Unfortunately, however, the logic of these systems, in order to take action and provide user posts in the form of status, commentary, and photographs, are designed specifically for use and display within the respective social networks and do not contemplate usage for real-time native smartphone telephony interactions.

Another problem that besets social network applications in providing user posts in the form of status, commentary, and photographs is that social networks do not have the logic or know-how to mix user posts and selected user personal data with smartphone telephony interactions and match it with user selected individuals of smartphone devices and user initiated telephony interactions. As a result, extending social user post capabilities to smartphone telephony interactions has yet to be made available.

Accordingly, there is a need in the art to connect user social post capabilities in the form of status, commentary, photographs, and other directed content with smartphone user contact records and subsequent smartphone telephony interactions so that users can share various status types such as status, commentary, photographs, and other content with their contacts, affiliated groups and/or desired recipients or any combination of people at the onset of a smartphone telephony or other visual telephony interaction via a phone line, cell tower, or the internet based on system and user defined parameters.

In addition, there is a need in the art to extend current social post and profile capabilities to be more personalized/individualized and dynamic so that users can share specific content and specific profile pictures with individual contacts, groups and/or desired recipients of any combination of people within their respective social networks.

BRIEF SUMMARY

The present disclosure is directed to a system that connects and displays user's selected personal smartphone data in conjunction with smartphone telephony interactions for user's selected smartphone contact records. The system manages and determines the fulfilment of user initiated post displays based on criteria selection of the user within said system to facilitate highly personalized and preference-based posts simultaneous to telephony interactions on behalf of the user. Such posts may include visual updates, status, content stored on the devices of the sender, receiver, and the internet, as well as new pictures/video that can be displayed during the establishment of real time smartphone telephony interaction between users. In addition, the system can combine delivery of data to and from a social network with data on the user's smartphone so as to create a unique post display to each contact record stored on user's smartphone or elsewhere.

In accordance with one embodiment, there is a communications system for bridging smartphone or otherwise stored personal data, smartphone telephony interactions and social networks. The system may include a user data access point connected to first data links to the smartphone-stored or otherwise stored personal data over carrier networks or social networks and receptive to data and routing information requests thereof. There may also be an enterprise data access point connected to second data link to access additional system users. Furthermore, there may be an application server connected to the incoming data access point. The post data and routing information requests may be segregated based at least on configurable routing and storage instructions. The system may further include a component database. Additionally, there may be a rules-based engine or integrations to APIs from other sources for automated categorization, routing, and storage. The engine may be connected to the application server and to the smartphone or enterprise data access point for communicating with the respective users.

According to another embodiment, there is provided a communications system for bridging smartphone or otherwise stored personal data, smartphone telephony interactions and social networks. The system includes a user data access point disposable in communication with a smartphone's stored data, contacts, telephony commands and social network applications to receive and send post therefrom. A rules engine is in communication with the user data access point and is configured to analyze the post requests and identify actionable updates associated with the post data and user access availability. The system and rules engine logic is configured to match the identified actionable characteristics with a prescribed set of processing rules. An application server is in communication with the user data access port and the rules engine and is configured to execute the set of processing rules matched with the identified actionable characteristics. A user data access point is in communication with the application server and disposable in communication with all user data access points to communicate with each for executing the processing rules.

The received post requests may include a content update, picture or other social communication format. A component database may include stored prioritization levels associated with post request attributes. The application server may be configured to assign a prioritization or other prioritization markets to the post requests in response to a query of a component database.

The communication system may additionally include an enterprise interface in communication with the enterprise data access point or other systems and may be configured to display user or enterprise information or offers in accordance with user records, rules and optimizations.

According to another aspect of the present invention, there is provided a method for bridging smartphone users and enterprises to provide users customized visual data, content and offers. The method includes analyzing the supplied smartphone user's data to identify actionable characteristics to then send enterprise data and targeted offers to the smartphone user's screen during a telephony transaction. The method further includes comparing the identified actionable attributes with a database of operational instructions matched with stored actionable attribute and rules/logic to identify operational instructions associated with the identified actionable attributes. The method additionally includes executing the identified operational instructions which includes sending a visual communication to a user during a telephony interaction.

The method may further include the step of storing the user data received from the smartphone.

The method may additionally include the step of matching the received user data with stored user data. The matching step may include matching the received user data with post history and status data associated with the user owner of the user data and or other similar users.

The method may further include the step of assigning a user post status state associated with a post status.

The method may also include the step of assigning a user post status associated with a social post delivery completion.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of the present invention. The description sets forth various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one entity from another without necessarily requiring or implying any actual such relationship or order between such entities.

Figure 1:
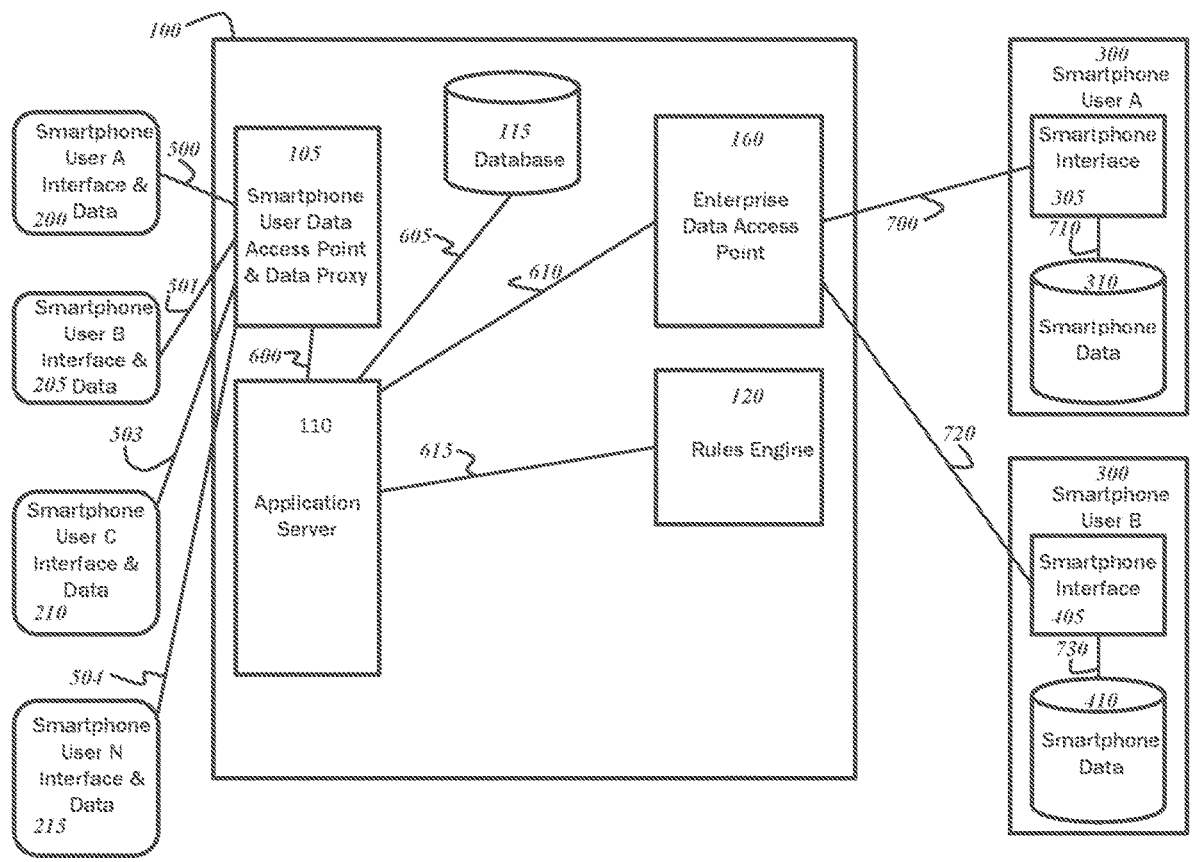
FIG. 1 is a block diagram illustrating one embodiment of a system that connects and displays selected user personal smartphone data posts in conjunction with smartphone telephony interactions for selected smartphone contact records in accordance with one embodiment of the present disclosure.

With reference to the block diagram of FIG. 1, there is a system 100 that connects and displays selected user personal smartphone data with smartphone telephony interactions. In accordance with one embodiment, the communications system 100 is contemplated to bridge smartphone or otherwise stored personal data, smartphone telephony interactions and social networks. The system 100 includes smartphone user access point and data proxy 105, which are connected to various smartphone user interfaces and data 200-215. By way of example, there is a user A interface and data 200 that is connected to the user access point and data proxy 105 over a connection 500, a user B interface and data 205 that is connected to the user access point and data proxy 105 over a connection 501, and a user C interface and data 210 that is connected to the user access point and data proxy 105 over a connection 503. These three user interface and data are presented by way of example only, and any additional number of user interfaces and data may be connectible to the user data access point and data proxy 105, e.g., user N interface and data 215. The aforementioned data is understood to be that which is stored on the respective smartphones, or other stored personal data over carrier networks or social networks.

There may also be an enterprise data access point 160 connected to second data links 700, 720 to access additional system users. These include a smartphone 300 for a user A, which includes a smartphone interface 305 and a smartphone data 310 that is accessed by the interface via a data interlink 710. Furthermore, by way of example, there may be another smartphone 300 for a user B, which includes a smartphone interface 405 and a smartphone data 410 that is accessed via a data interlink 730.

As shown in FIG. 1, the system 100 includes an application server 110 that is connected to the incoming data access point, i.e., the smartphone user data access point and data proxy 105 as well as the enterprise data access point 160. The post data and routing information requests may be segregated based at least on configurable routing and storage instructions. The system may further include a component database 115 that is utilized by the application server 110 over an interlink 605. Additionally, there may be a rules-based engine 120, as well as integrations to APIs from other sources for automated categorization, routing, and storage. The rules engine 120 may be connected to the application server over an interlink 615. Additionally, the application server 110 is connected to the enterprise data access point 160 over an interlink 610, and the smartphone user data access point and data proxy 105 is connected to the application server 100 over an interlink 600.

Figure 2:
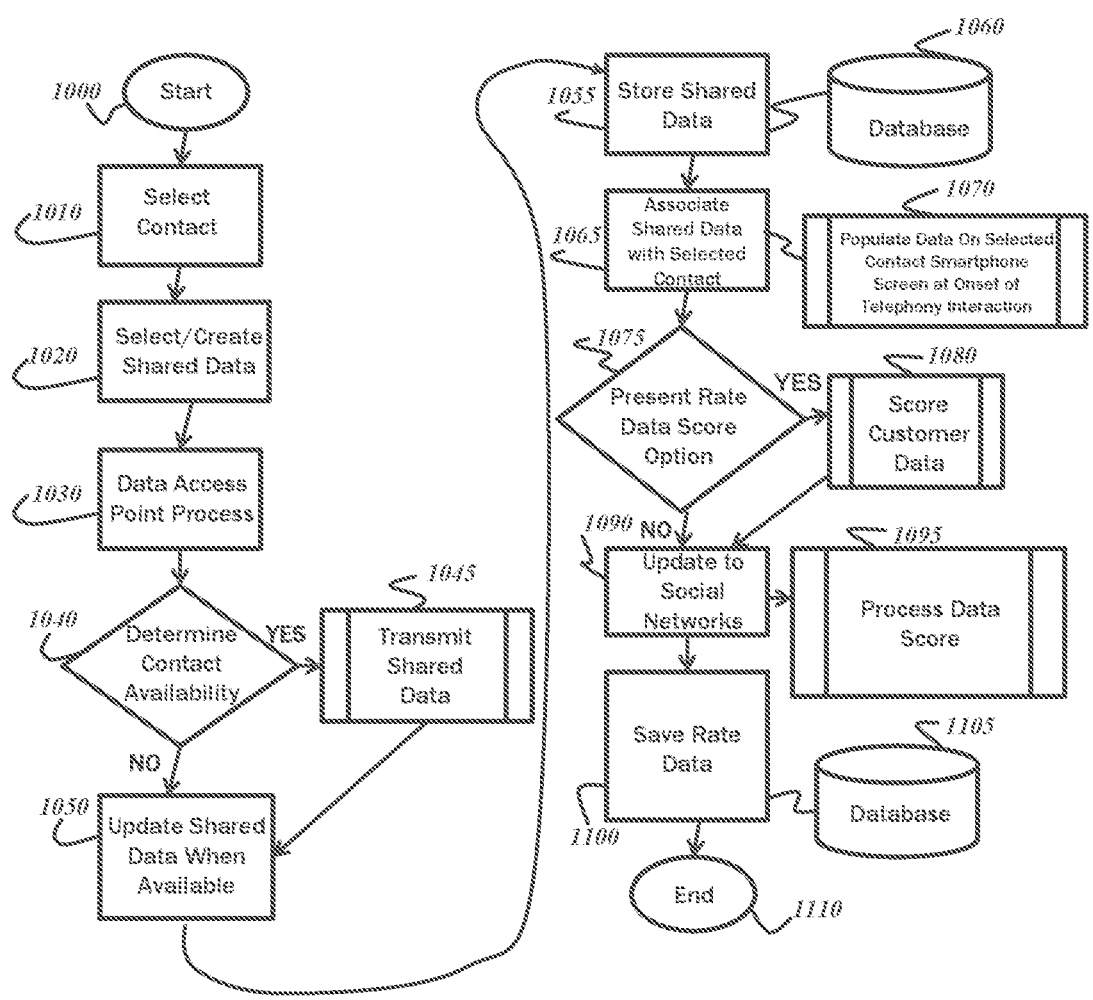
FIG. 2 is a flowchart showing the steps of selecting, receiving, labeling, and storing user personal post data for use with selected smartphone contact records in conjunction with smartphone telephony interactions.

Referring now to the flowchart of FIG. 2, one embodiment of a method 1000 for bridging smartphone users and enterprises to provide users customized visual data, content and offers will be described. In the exemplary embodiment, the user selects a contact in accordance with a step 1010. Furthermore, that user also selects or creates shared data in a step 1020. It is understood that this shared data may originate from various social networking services, specifically, the user content provided thereto and/or may be incorporated back into such social networks schema that allows users to share specific content and specific profile pictures with individual social network contacts, groups and/or desired recipients of any combination of people within their respective social networks.

The method proceeds to a step 1030 where the data access point 105, 160 processes the selected data. In accordance with a decision branch 1040, the availability of the selected contact is determined. If the contact is available, then the selected shared data is transmitted to the system 100. Otherwise, the shared data is updated when it becomes available in accordance with a step 1050. The shared data is stored in a database 1060 in accordance with a step 1055, then the shared data is associated with the selected contact in a step 1065. Various fields of the record associated with the selected contact on the smartphone are then populated with the shared data at the onset of a telephony interaction in accordance with a step 1070. Thus, data originating from social networking sites and other contemplated sources may be retrieved for this record field population operation.

If, in a decision branch 1075, it is evaluated that a rate data score option is to be presented, the method proceeds to a step 1080 of scoring the customer data. Then, updates are sent to a designated social networking service in a step 1090, and to the extent the customer data is scored, it is processed in a step 1095. The method also includes a step 1100 of saving the rate data into a database 1105. The method then ends 1110.

As indicated above, the present disclosure contemplates the sharing of different content for different users or subgroups of users. According to other embodiments of the disclosure, this may be applied in contexts other than mobile devices, such as, for example, the content shared on social networking sites or accessible via smartphone apps. More particularly, person A may see Profile Picture A of an individual, whereas Person B may see Profile Picture B of an individual within their social network and so on rather than everyone seeing Picture A. The dynamically varying content need not be limited to profile pictures, but also to update streams, comments, posts, and so forth, and each grouping of contacts may be designated to receive unique content as defined or segmented by the owner of the account. Continuing with the foregoing example, Person A who sees Profile Picture A, may receive Update Stream A, whereas Person B who sees Profile Picture B, may receive a different Update Stream B. In some cases, a mixture of content in Update Stream A and Update Stream B may be presented.

Figure 3:
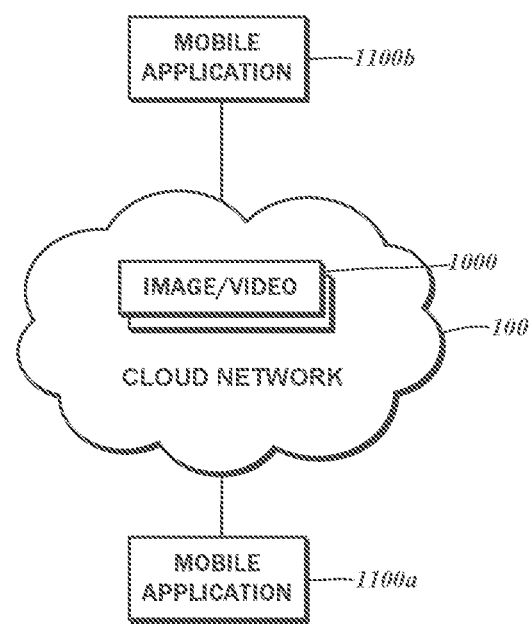
FIG. 3 is a block diagram depicting the system for connecting and displaying selected user personal smartphone data posts across multiple smartphone devices.

The block diagram of FIG. 3 depicts the system 100 on a more generalized level. As indicated above, the system 100 stores the aforementioned images, videos, and other content 1000 that is uploaded from the respective mobile devices and stored thereon for subsequent transmission. The mobile devices each execute a mobile application 1100, with a first mobile device running a mobile application 1100*a* and a second mobile device running a mobile application 1100*b*.

Figure 4A:
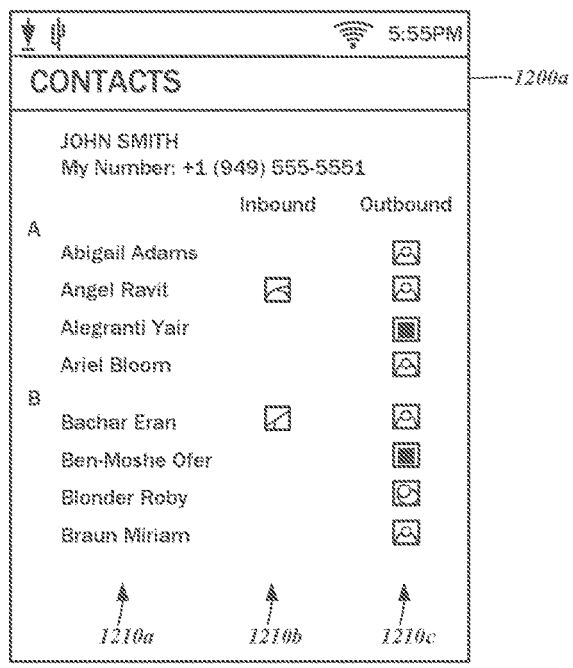
FIGS. 4A-C are screen shots of a sequence of exemplary user interface displays of a smartphone application for use with the system that connects and displays selected user personal smartphone data posts.
Figure 4B:
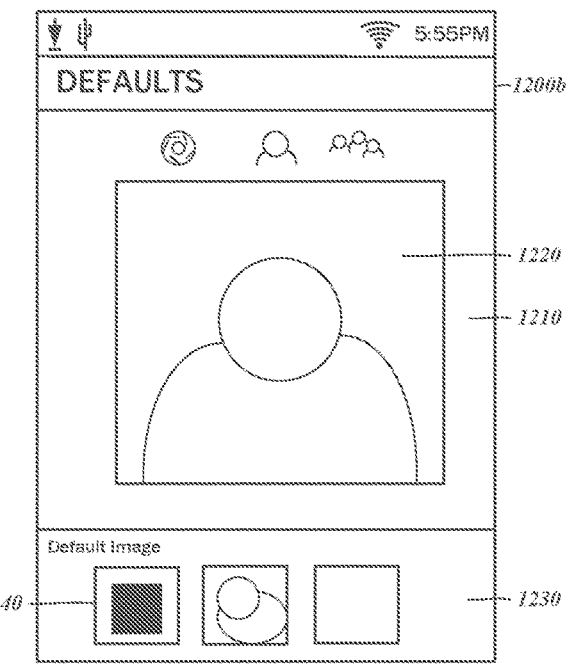
Figure 4C:
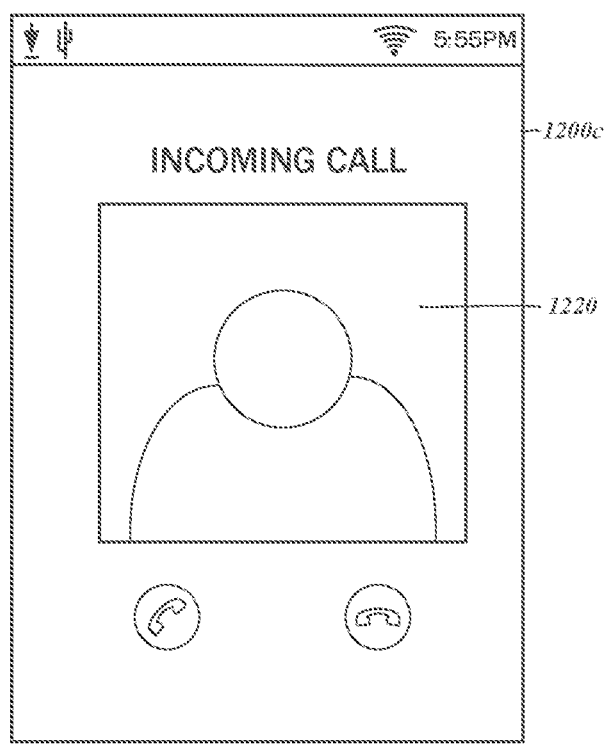

The screen shots of FIG. 4A-4C depict one exemplary user interface 1200 of the mobile application 1100 running on the various mobile devices that connect to the system 100 displaying selected user personal smartphone data with smartphone telephony interactions. Specifically, FIG. 4A is of an interface screen 1200*a* for contacts stored on the mobile device, and is a listing of names and associated contact information such as phone numbers, e-mail addresses, and the like that are arranged in alphabetical order. In addition to name information shown in a first column 1210*a*, this listing may also include an inbound visual data column 1210*b* and an outbound visual data column 1210*c*.

As indicated above, it is possible for certain personal data selected by a user of the smartphone initiating the telephony interaction to be presented on the non-initiating or receiving end smartphone at the start of the telephony interaction. In this regard, the user of the smartphone corresponding to the interface screen 1200*a*, e.g., "John Smith" may either initiate the telephony interaction or receive the telephony interaction initiated by another user. This user may designate an image or other visual data to be displayed, and an interface screen 1200*b* is the way in which this may be achieved. A main portion 1210 of the interface screen 1200*b* includes a selected image 1220, though other possible images may be designated via a selection interface 1230 that includes one or more reduced-size representations or icons of other visual data 1240. It will be recognized that selecting these other icons is operative to replace the main portion 1210 with a larger size representation of the selected visual data 1240. In this manner, the user may designate visual data to be presented to users on the receiving end of a telephony interaction, with the outbound visual data column 1210*c* including a further reduced representation of the selected visual data for that contact. For example, the contacts "Abigail Adams," "Angel Ravit," "Ariel Bloom," "Bachar Eran," and "Braun Miriam" are assigned the same image 1220.

When any of these users is on the receiving end of a telephony interaction initiated by the user, e.g., "John Smith," as shown in an exemplary interface screen 1200*c* of FIG. 4C, the image 1220 is displayed. Along these lines, the inbound visual data column 1210*b* include reduced representations of visual data that the users corresponding to that contact have assigned for displaying on the current user's, e.g., "John Smith" smartphone when receiving a telephony interaction therefrom.

Although the foregoing examples variously refer to images presented to users, it is expressly contemplated that any data, including video data, audio data, text data, and any other data that may be visually represented may be substituted without departing from the scope of the present disclosure.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for bridging and assigning specific users' personal data contained on communications devices and social networking services with user associated contacts at the onset of a telephony interaction, the method comprising:
   receiving, from a first user, a first selection of data destined for a second user, the first selection being made on a selection interface screen of a remote application on a device associated with the first user;
   sending the first selection of data to a device associated with the second user, the first selection of data being presentable on the device associated with the second user in connection with a telephony interaction initiated by the first user to the second user on the device associated therewith;
   matching, based upon the designation of the second user by the first user, a user account on a remote service associated with the second user;
   retrieving, based upon the matching of the second user to the corresponding user account on the remote service, a second selection of data of the second user from a collection of data dynamically defined thereby;
   scoring the second selection of data of the second user;
   selectively sending the second selection of data to the first user based upon the scoring thereof, the second selection of data being presentable to the first user in connection with a telephony interaction initiated by the second user to the first user;
   associating the second selection of data sent to the first user as inbound visual data, and the first selection of data as outbound visual data, each for an entry in a listing of names corresponding to the second user; and
   displaying the entry corresponding the second user on a listing of names on a contacts interface screen, a reduced representation of the inbound visual data and a reduced representation of the outbound visual data being displayed in respective, adjacently positioned columns;
   wherein the telephony interactions are voice calls.

2. The method recited in claim 1 further comprising identifying actionable characteristics associated with the first selection of data based upon an analysis of a user state of the first user, wherein the analysis of the user state includes identifying routing, origination or destination information associated with the first selection of data.

3. The method recited in claim 1 further comprising identifying actionable characteristics associated with the first selection of data based upon an analysis of a user state of the first user, wherein the analysis of the user state includes processing the first selection of data with a rules engine to identify the actionable characteristics.

4. The method recited in claim 3 wherein the rules engine categorizes the identified actionable characteristics into predefined categories, the categories being associated with operational instructions.

5. The method recited in claim 3 wherein the rules engine analyzes the user state to determine the operational instructions.

6. The method recited in claim 1 further comprising:
   identifying actionable characteristics associated with the first selection of data based upon an analysis of a user state of the first user; and
   comparing the identified actionable attributes with a database of operational instructions matched with stored actionable attributes to identify operational instructions associated with the identified actionable attributes, wherein the comparing step includes determining routing instructions for the first selection of data to be sent to the second user.

7. The method recited in claim 1 further comprising:
   identifying actionable characteristics associated with the first selection of data based upon an analysis of a user state of the first user; and
   comparing the identified actionable attributes with a database of operational instructions matched with stored actionable attributes to identify operational instructions associated with the identified actionable attributes, wherein the comparing step includes assigning a prioritization to the operational instructions when the user state meets a prescribed prioritization threshold.

8. The method recited in claim 1 further comprising matching the received first selection of data with stored data.

9. The method recited in claim 8 wherein the matching step includes matching the received first selection of data with data associated with the first user.

10. The method recited in claim 1 further comprising transmitting instructions to the remote service to publish the first selection of data and the score thereof, the first selection of data being prioritized based upon the score associated therewith.

11. The method recited in claim 1, further comprising displaying, on the remote application, respective contact information in association with the listing of names.

12. The method recited in claim 1, further comprising: identifying actionable characteristics associated with the first selection of data based upon an analysis of a user state of the first user as defined on the remote service; comparing the identified actionable attributes with a database of operational instructions matched with stored actionable attributes to identify operational instructions associated with the identified actionable attributes; and executing the identified operational instructions.

13. The method recited in claim 1 further comprising identifying actionable characteristics associated with the second selection of data based upon an analysis of a user state of the second user as set thereby on the remote service, wherein the analysis of the user state includes identifying routing, origination or destination information associated with the second selection of data.

14. The method recited in claim 1 further comprising transmitting instructions to the remote service to publish the second selection of data in conjunction with the telephony interaction.

* * * * *